United States Patent [19]

Meyer

[11] Patent Number: 4,750,167
[45] Date of Patent: Jun. 7, 1988

[54] DIGITAL AUDIO TRANSMISSION SYSTEM

[75] Inventor: Charles S. Meyer, Nevada City, Calif.

[73] Assignee: The Grass Valley Group, Inc., Grass Valley, Calif.

[21] Appl. No.: 920,825

[22] Filed: Oct. 20, 1986

[51] Int. Cl.⁴ .............................................. H04J 3/00
[52] U.S. Cl. .......................................... 370/77; 381/2
[58] Field of Search ....................... 381/2; 370/77, 119

[56] References Cited

U.S. PATENT DOCUMENTS 4,641,309  2/1987  Nakano et al. ........................ 371/31
4,646,170  2/1987  Kobayashi et al. ................... 371/38

OTHER PUBLICATIONS

Moriya et al., Digital Trans. System for Stereo Broadcasting, Dec. 1979, pp. 1–19.

Primary Examiner—Douglas W. Olms
Assistant Examiner—James E. Busch
Attorney, Agent, or Firm—Francis I. Gray

[57] ABSTRACT

A digital audio transmission system which is compatible with common carrier digital hierarchy systems converts two channels of analog data, such as precision stereo audio, into high resolution digital data words sampled at a high frequency. The data words are parity checked with the addition of one bit and divided into odd and even bit words for each channel. The bit words are time domain multiplexed into a common carrier frame with separate words for the parity bits and alternating channel data consisting of an odd and an even bit word. Each bit word is checked for all zeros and modified accordingly to assure that ones density and consecutive zero restraints are achieved. The resulting common carrier frames are transmitted over the appropriate common carrier cross-connects to a receiver which decodes the frames, recovering the bit and parity words. The bit words are recombined into data words and checked for parity. The data words are reconverted to the analog data, with valid data words being substituted for data words having a parity error. The analog data is sampled to divide it into the original two channels, resulting in a high precision recreation of the original analog data.

6 Claims, 7 Drawing Sheets

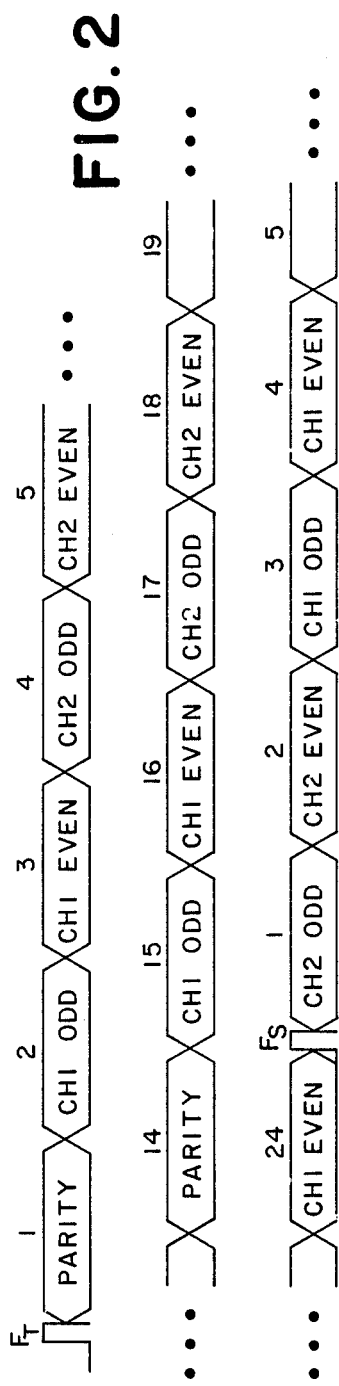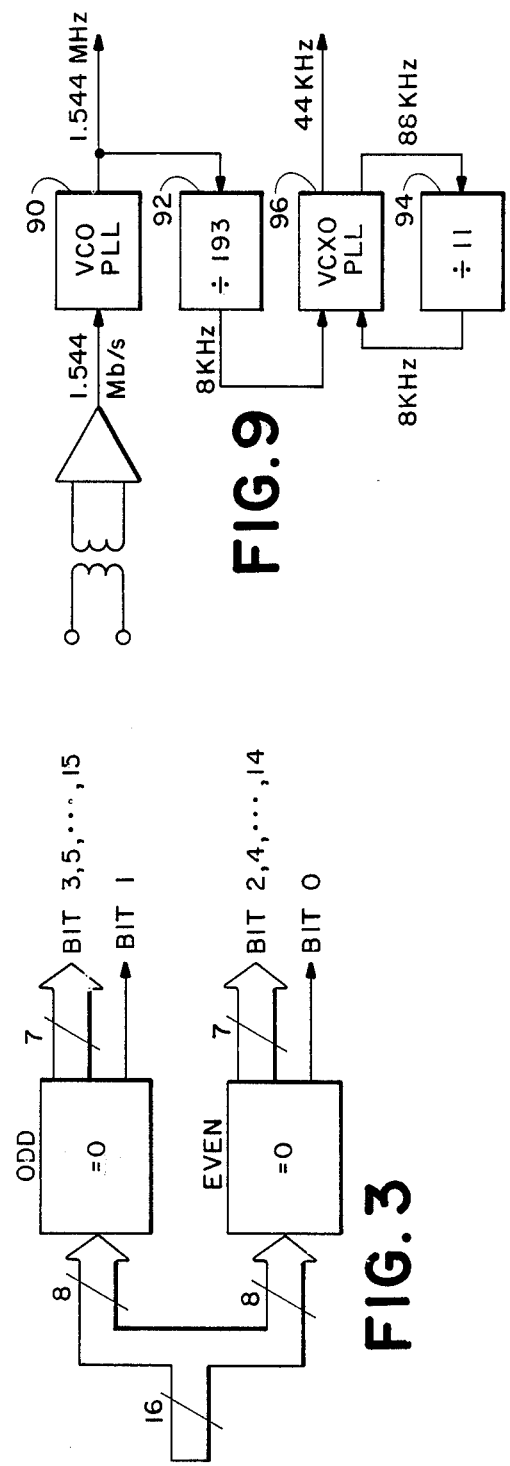

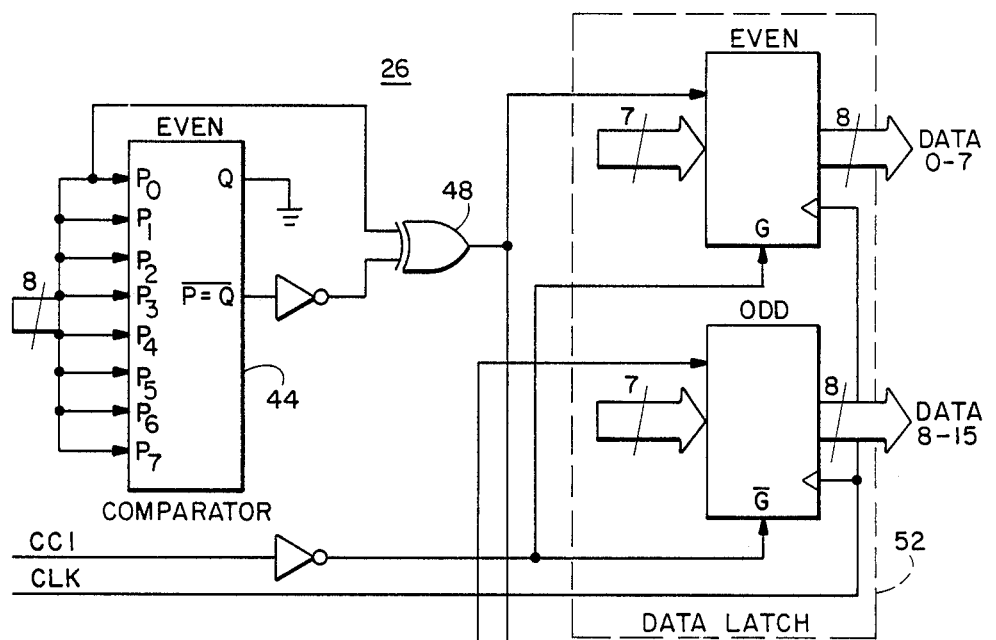
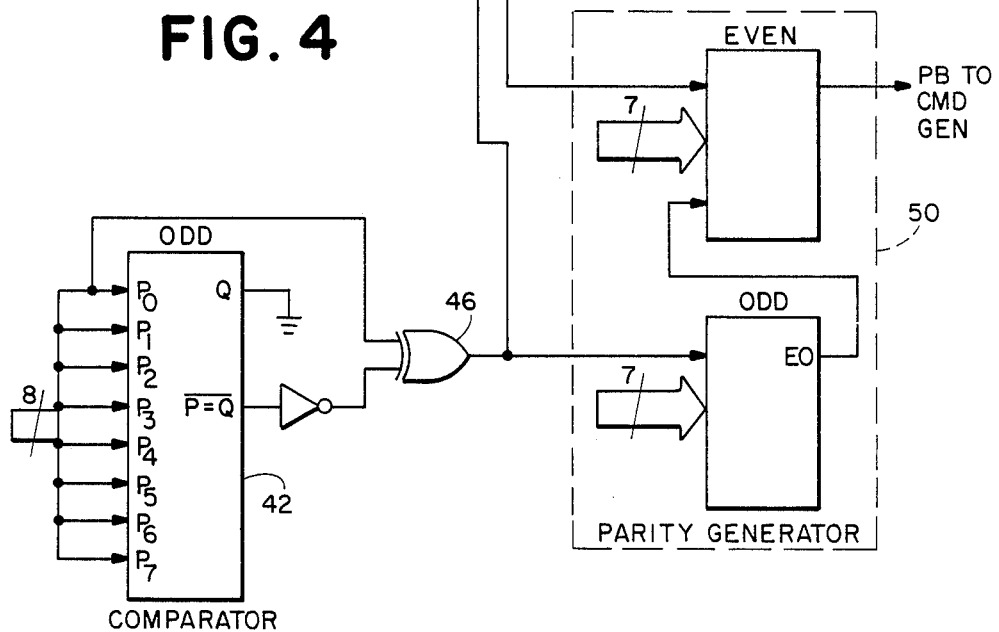
FIG. 4

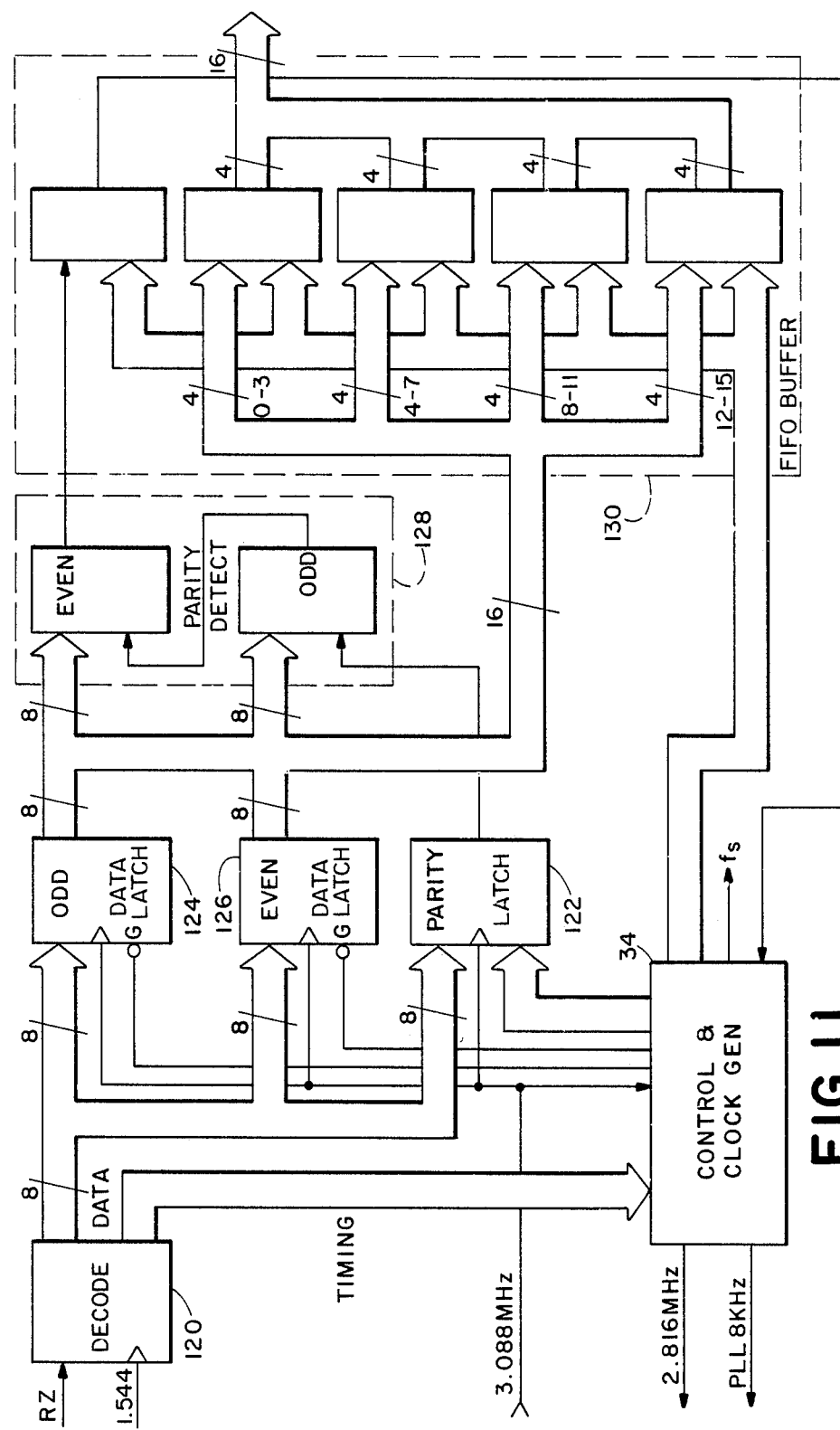

DIGITAL AUDIO TRANSMISSION SYSTEM

BACKGROUND OF THE INVENTION

The present invention relates to data transmission systems, and more particularly to a digital audio transmission system for transmitting broadcast or production quality audio program material over the intercontinental network of the common carriers such as the telephone companies.

The American Telephone and Telegraph Company Technical Advisory No. 34 establishes an interconnection specification for digital cross-connects. The described network is a digital hierarchy to accommodate sources of digital signals which operate at different bit rates. At any given hierarchy level the different digital signal sources must have certain common characteristics to permit interconnection with the common carrier transmission facilities at that level as well as with multiplexers connecting that level to a higher level. The present defined levels are: DS1 (1.544 Mb/s), DS1C (3.152 Mb/s), DS2 (6.312 Mb/s), DS3 (44.736 Mb/s) and DS4 (274.176 Mb/s). Digital equipment is terminated at a standard level cross-connect (DSX-N), and the interconnection specifications for the cross-connect describe the required characteristics for the digital equipment interconnected by the cross-connect.

The DS1 signal is the lowest level in the digital hierarchy at 1.544 Mb/s, but is sufficient to provide for quality transmission of audio signals The DSX-1 specification requires that the digital signals be bipolar with at least 12.5 percent average ones density and no more than fifteen consecutive zeros. The pulses shall fit within an essentially square wave template with a specified pulse amplitude. One DS1 signal normally contains 24 DS0 signals, where a DS0 signal is one normal telephone call. This telephone audio information is received at the central office on a standard twisted pair cable and sampled at a rate of 8 kHz with a resolution of 8 bits. The 24 DS0 8-bit samples are then time division multiplexed with the addition of one framing bit to form a 193-bit frame. The frame rate is the same as the DS0 sampling rate of 8 kHz, thus leading to a data rate for the DS1 channel of 1.544 Mb/s. A master frame is composed of 193-bit subframes of two types, timing and signaling. The timing frames are so named because the framing bit is used to extract the synchronization information of the master frame at a receiver, and the signaling frames are so named because in these frames DS0 bits may be overridden by telephone company signaling information. These two types of frames alternate.

What is desired is a method for transmitting high precision analog signals, such as studio quality audio signals, over common carrier networks in a manner compatible with the common carrier cross-connect system.

SUMMARY OF THE INVENTION

Accordingly the present invention provides a digital audio transmission system which is compatible with the digital common carrier cross-connect system. The two channels of a high precision stereo audio signal are time division multiplexed into a common carrier defined frame. The audio signal is sampled at a high frequency, coded linearly to a 16-bit resolution and one-bit parity coded. Each frame has six samples of one channel and five samples of the other channel, with the next frame having five samples of the one channel and six samples of the other channel, so that eleven samples of each channel are transmitted for each two frames. The 16-bit samples are scrambled so that first the even bits are transmitted and then the odd bits, and each of these 8-bit groups are tested for all zeros. If there are all zeros in a group, then the least significant bit is set to one, thus guaranteeing a 12.5 percent ones density and no more than fourteen consecutive zeros. At a receiver the frames are decoded and the 16-bit samples are reconstructed and checked for parity. The samples are converted to analog, with those samples having a parity error being replaced with a valid sample. The analog signal is sampled at a rate to restore the two channels of the audio signal. The result is that a high precision stereo audio signal may be transmitted over a common carrier network while maintaining the precision quality of a compact disc.

Other objects, advantages and novel features of the present invention will be apparent from the following description when read in conjunction with the appended claims and attached drawing.

BRIEF DESCRIPTION OF THE DRAWINGS

FIG. 2 is a representation of a digital audio framing system according to the present invention.

FIG. 3 is a simplified block diagram illustrating a zero check system according to the present invention.

FIG. 4 is a block diagram of a zero check and parity generation circuit for the system according to the present invention.

FIG. 9 is a simplified block diagram of a clock circuit for the receiver portion of the system according to the present invention.

FIG. 11 is a block diagram of a data latch and parity check circuit for the system according to the present invention.

DESCRIPTION OF THE PREFERRED EMBODIMENT

Figure 1:
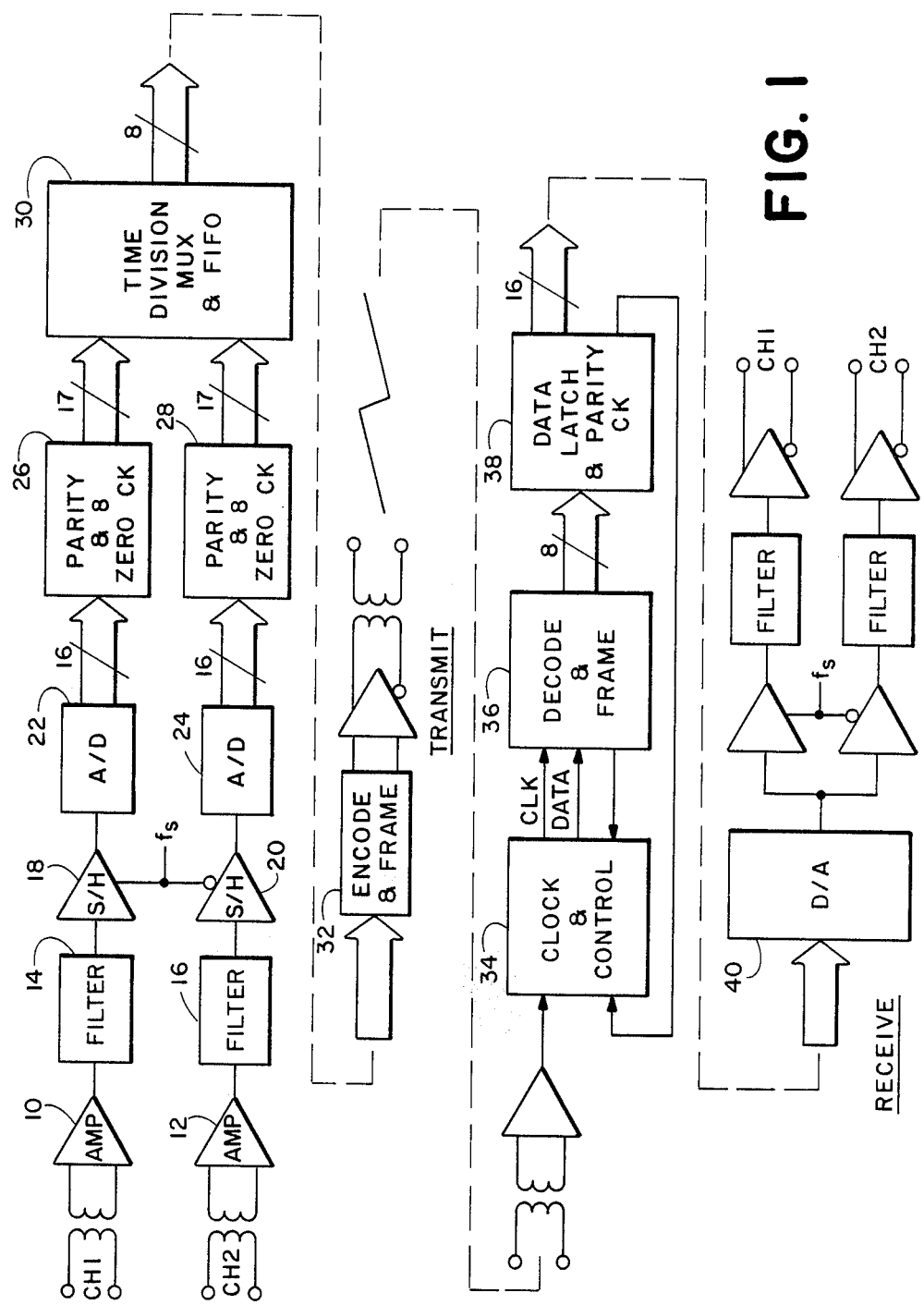
FIG. 1 is a block diagram of a digital audio transmission system according to the present invention.

Referring now to FIG. 1 a digital audio transmission system is shown having two channels of analog input data, such as the left and right channels of stereo audio. The analog input data is amplified by respective input amplifiers 10, 12 and filtered by respective passband filters 14, 16. The resulting signal is then sampled by respective sample and hold circuits 18, 20 at a rate $f_s$ which is some high frequency, preferably greater than 40 kHz. The sampling frequency $f_s$ may be determined by examining the following relationship:

$$f_s=(1.544Mb/s-8kb/s)/2*(16+1)$$

producing an upper bound of 45.1765 kHz where 1.544Mb/s is the DS1 bit rate, 8kb/s is the frame bit rate, and 2*(16+1) is the number of bits for one sample for each channel. To guarantee frame synchronization: $f_s=(M*1.544Mb/s)/2*(193 \text{ bits/frame})=M*4 \text{ kHz}$ where M is an integer. Thus $f_s=44$ kHz.

The result is that the number of samples per frame is:

$$NS=2*44kHz/8 \text{ kHz}=11 \text{ samples/frame}.$$

Since there are two types of frames, timing and signaling, there are 22 samples for every two frames with six samples of one channel and five samples of the second channel in the first frame, and five samples of one channel and six samples of the second channel in the second frame. The same information used to differentiate between frame types in the common carrier cross-connect system may be used to determine which samples are to be allocated to which frames.

The sampled analog data from the sample and hold circuits 18, 20 are then digitized by respective analog to digital (A/D) converters 22, 24 with a 16-bit resolution. Each 16-bit sample is checked for all zeros by respective parity and zero check circuits 26, 28 and a parity bit is added. The zero check, as illustrated by FIG. 3, is performed by separating the odd and even bits into two 8-bit words, and if all the bits within a word are zero, setting the least significant bit equal to one. The parity bit is added to provide an error check since the transmission medium has a bit error rate of $10^{-6}$ which equates to 1.5 errors per second at the 1.544 Mb/s DS1 rate. Such errors, if not detected and removed or smoothed, manifest themselves as audible and irritating "pops". Thus, if a parity error is detected at the receiver, an appropriate smoothing algorithm is used to generate a valid data value to replace the erroneous data value.

A multiplexer circuit 30 combines the outputs of the parity and zero check circuits 26, 28 and outputs a series of 8-bit words. These 8-bit words are input to an encoder and framing circuit 32 which converts the digital words into a pulse sequence for transmission over the common carrier cross-connect.

At the receiver the pulse sequence is input to a clock and control circuit 34 which generates a clock signal from the received sequence and passes the data with the clock signal to a decoder and framing circuit 36. The decoder and framing circuit 36 restores the 8-bit data word string, with each word being stored in a data latch 38 until a full sample of 16 bits is obtained together with the appropriate parity bit. Parity is tested and, if parity is valid, the sample is passed on to a digital to analog (D/A) converter 40. If parity is invalid, the prior sample for that channel is passed again to the D/A converter 40 and the invalid sample is dropped. Alternatively the prior valid sample and the next valid sample may be averaged or digitally filtered to provide an interpolated sample to replace the invalid sample. The output of the D/A converter 40 is separated into separate analog channels by the sample frequency $f_s$, which channels are amplified, filtered and converted into a balanced output to recover the original, transmitted digital audio signal.

The 16-bit samples are separated into 8-bit words having exclusively even or odd bits, which words are checked for all zeros by the parity and zero check circuits 26, 28. The words from the two channels are put into a master frame as shown in FIG. 2. The first subframe is a timing frame having a single timing bit $F_t$ followed by twenty-four 8-bit words. The first word has parity bits for the first six samples and is followed by twelve words having respectively an odd bits 8-bit word and an even bits 8-bit word for channel one succeeded by an odd bits 8-bit word and an even bits 8-bit word for channel two, alternating between the two channels. Word fourteen contains the remaining five parity bits, followed by alternating samples from channels one and two as above. The last sample in the timing frame is from channel one. The next subframe, the signal frame, has a single signal bit $F_s$ also followed by twenty-four 8-bit words. The configuration of this subframe is the same as the first subframe except that the first sample is from channel two.

The parity generator and zero check circuit 26, 28 is shown in greater detail in FIG. 4. The separated bits are input into respective odd and even zero comparators 42, 44 which output a signal if all the inputs are zero. This zero signal is combined with the least significant bit of the group by an exclusive OR gate 46, 48 which passes the value of that bit directly on to the next stage in the absence of a zero signal, or sets that bit to one in the next stage if a zero signal is present. The seven most significant bits are input to a parity generation circuit 50 and to a data latch 52 together with the least significant bits from the exclusive OR gates 46, 48. The parity generation circuit 50 outputs a parity bit for the 16-bit sample which is input to a command generation circuit 62 shown in FIG. 7.

Figure 5:
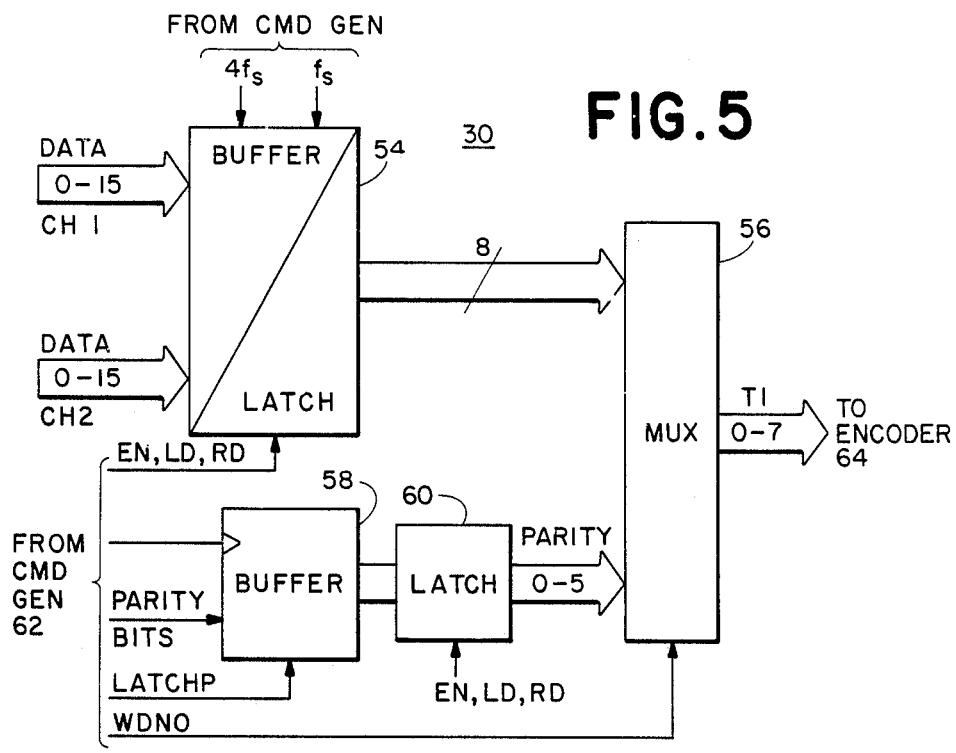
FIG. 5 is a block diagram of a time division multiplexer and FIFO buffer for the system according to the present invention.
Figure 6:
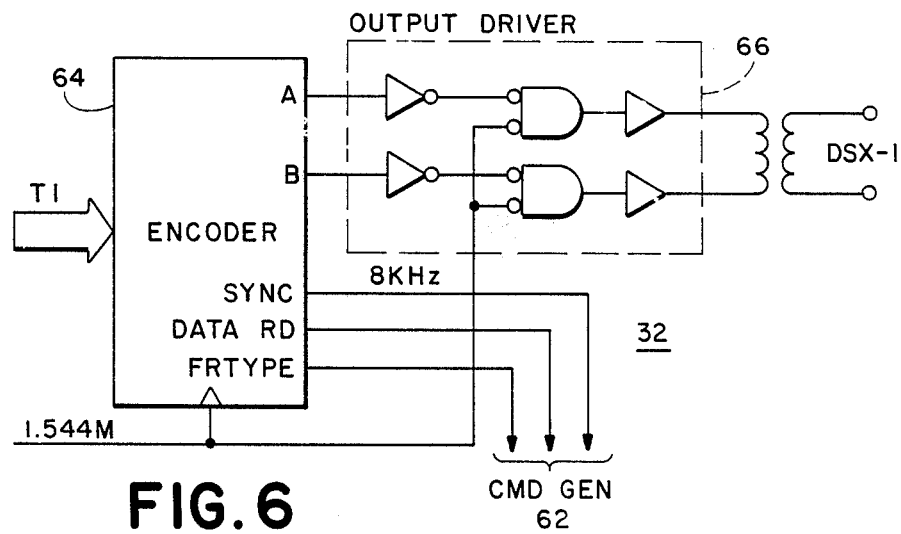
FIG. 6 is a block diagram of an encoder and output circuit for the system according to the present invention.

The data latch 52 is clocked into a first in-first out (FIFO) buffer/latch circuit 54 together with the corresponding data from the second channel as shown in FIG. 5. Since there are thirty-two bits of input data which is output eight bits at a time, the data is stored at one rate and transferred to the latch portion at a second rate, which rates are related to $f_s$. Enable, load and read commands from the command generation circuit 62 transfer the data from the buffer portion to the latch portion of the buffer/latch circuit 54, and thence to a multiplexer circuit 56. The parity bits are accumulated by the command generation circuit 62, loaded into a parity buffer 58, transferred to a parity latch 60 and thence output to the multiplexer 56 according to appropriate enable, load and read commands. According to the word number as shown in FIG. 2 the multiplexer 56 outputs either a parity word or data words. The output from the multiplexer circuit 30 is a series of 8-bit words containing either data or parity bits.

These words are input to an encoder 64 where the master frame, as shown in FIG. 2, is compiled. The data is converted into a serial unipolar, two output data stream and input to an output driver 66. The output driver 66 is clocked at the 1.544Mb/s rate and outputs a bipolar signal to the common carrier cross-connect for transmission over the telephone network. The encoder 64 also outputs SYNC at 8 kHz, DATARD to read the next data word into the encoder, and FRTYPE to identify the type of frame (timing or signal) to the command generator circuit 62.

Figure 8:
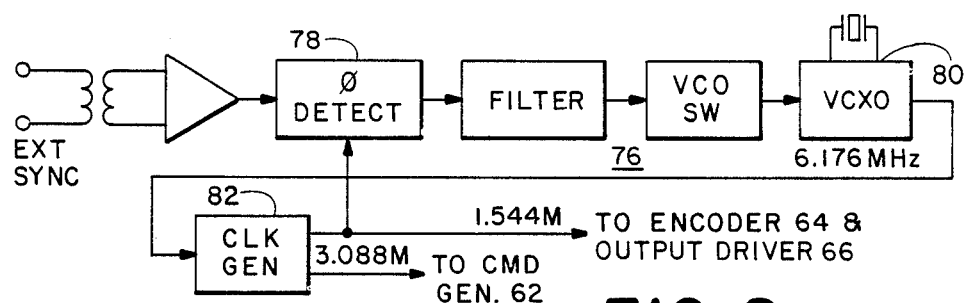
FIG. 8 is a block diagram of a clock circuit for the transmitter portion of the system according to the present invention.
Figure 7:
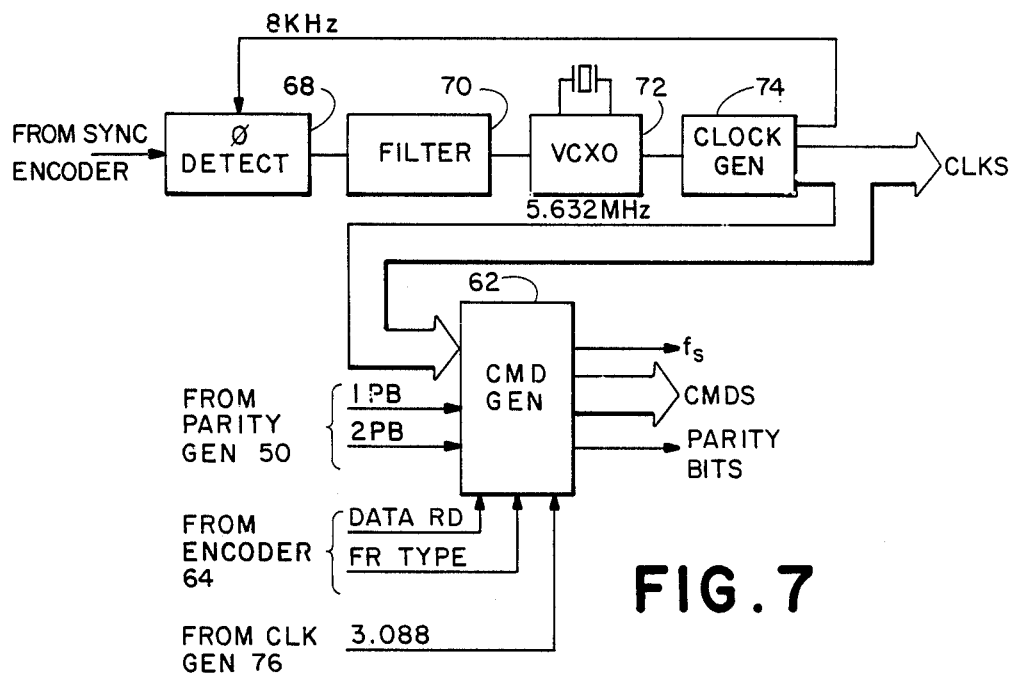
FIG. 7 is a block diagram of a command generator circuit for the transmitter portion of the system according to the present invention.

The clock and command generation is illustrated in FIGS. 7 and 8. The SYNC from the encoder 64 is input to a phase detector 68 and compared with a phase locked loop 8 kHz signal. The output of the phase detector 68 passes through a loop filter 70 and controls the frequency of a voltage controlled crystal oscillator 72 having a nominal frequency of 5.632 MHz from which the sampling frequency $f_s$ is derived. The output of the VCXO 72 is input to a clock generator 74 which provides the phase locked loop 8 kHz signal for the phase detector 68 as well as the clock signals for the other circuitry of the system including the command generation circuit 62. The command generation circuit 62 receives signals from the parity generation circuit 50, the encoder 64 and a clock generator 76 and outputs appropriate commands including the sampling frequency $f_s$ and the accumulated parity bits. The clock circuit 76 is synchronized with an external 1.544 MHz source which is converted to a return to zero signal and compared with a clock generated 1.544 MHz signal in a phase detector 78. The output of the phase detector 78 is filtered and used to control a VCXO 80 having a nominal frequency of 6.176 MHz. A clock generator 82 provides the 1.544 MHz signal and a 3.088 MHz signal to synchronize the command generation circuit 62.

At the receiver the balanced input is transformed to return to zero data (RZ) and input to a clock and control circuit 34. The clock and control circuit 34 synchronizes an internal clock with the 8 kHz frame bits to generate the clock required for the receiver. The data and the clock are input to a decode and framing circuit 36 where the data is extracted in the form of the originally transmitted 8-bit words. The 8-bit words are stored in a data latch and parity check circuit 38 where the samples are reconstructed with the appropriate parity bit to assure that there is no transmission error. The 16-bit samples are forwarded to a digital to analog converter 40 where the samples are converted to the original analog signals which are separated into the two separate channels by $f_s$, amplified, filtered and converted to a balanced output.

Figure 10:
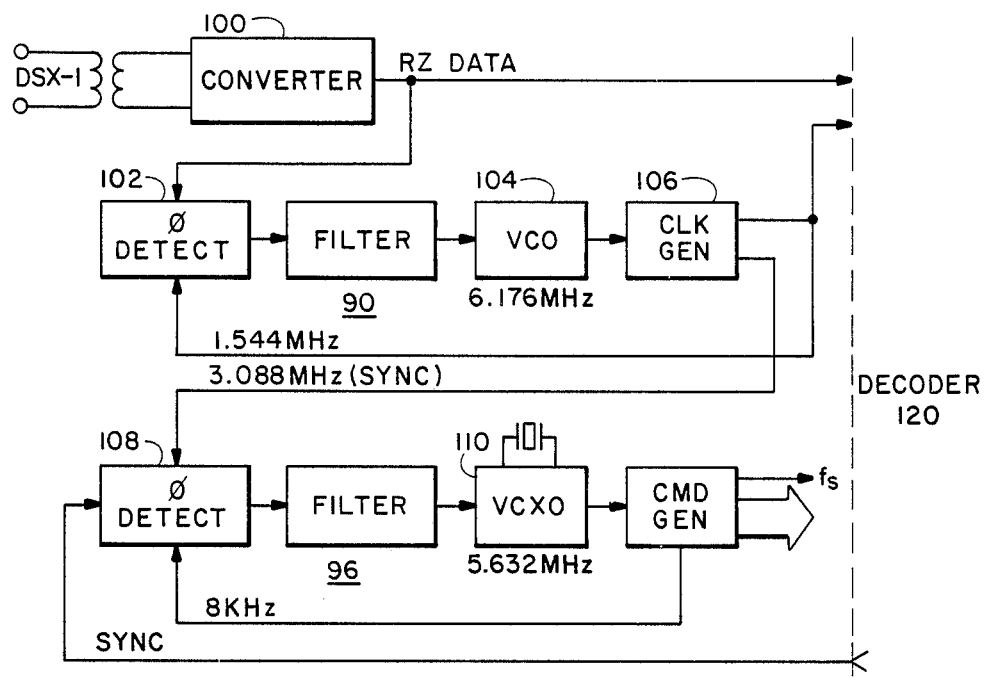
FIG. 10 is a block diagram of the clock circuit and a command generation circuit of the receiver portion of the system according to the present invention.

As shown in FIG. 9 the received data at 1.544Mb/s is input to a phase locked loop tank circuit (LC) oscillator 90 to generate the necessary synchronization and clock signals corresponding to the data rate 1.544 MHz, the sample rate 44 kHz, and the frame rate 8 kHz by the use of appropriate dividers 92, 94 and a second phase locked loop voltage controlled crystal oscillator 96. The clock and control circuit 34 is shown in still greater detail in FIG. 10. A threshold detect and slicer circuit 100 converts the data received from the common carrier cross-connect at the 1.544 Mb/s rate into return to zero data which is input to a decoder 120 and to a first phase detector 102. The phase detector 102 compares the input data rate with a clock generated internal 1.544 MHz signal and outputs an output control voltage which is filtered and used to control an LC oscillator 104 having a nominal frequency of 6.176 MHz. A clock generator circuit 106 provides the internal 1.544 MHz signal and a 3.088 MHz sync signal for the second phase locked loop 96. A second phase detector 108 compares an internally generated 8 kHz signal with a SYNC signal at 8 kHz from the decoder 120, and controls a VCXO 110 having a nominal frequency of 5.632 MHz. The data and the 1.544 MHz clock are input to the decoder 120 which outputs the 8-bits. reconstructed words as shown in FIG. 2 as well as synchronization information derived from the frame bits of the data.

FIG. 11 illustrates the processing of the 8-bit words decoded by the decoder 120. The timing information derived from the frame bits, $F_t$ and $F_s$, are input to the control and clock generation circuit 34 at a 8 kHz rate which is used to phase lock the VCXO circuit 96 as described above. The parity words are shifted into a parity latch 122 upon command from the control and clock generator circuit 34 which keeps track of the frame type and word count based upon the timing information received from the decoder 120. The data words are alternately input to odd and even data latches 124, 126 according to gate enable commands from the control and clock generator circuit 34. The 3.088 MHz clock is used to load the data into the latches. The data words from the data latches 124, 126 together with the appropriate parity bit shifted out from the parity latch 122 are input to a parity detect circuit 128. The parity detect circuit 128 outputs a signal to a FIFO buffer 130 to which the reconstructed 16-bit sample is also input. These seventeen bits are shifted into the buffer 130 upon command. A subsequent shift out command transfers the data at the input to the output of the buffer if parity is correct, or is inhibited so the data is not shifted out when a parity error is detected, i.e., the prior sample is still output from the D/A converter 40 when a parity error is detected. The output of the buffer is input to the D/A converter 40 to recover the original analog signal, and subsequently sampled to recover the two channels of data from the analog data stream, filtered and converted to a balanced output as described above.

Figure 12:
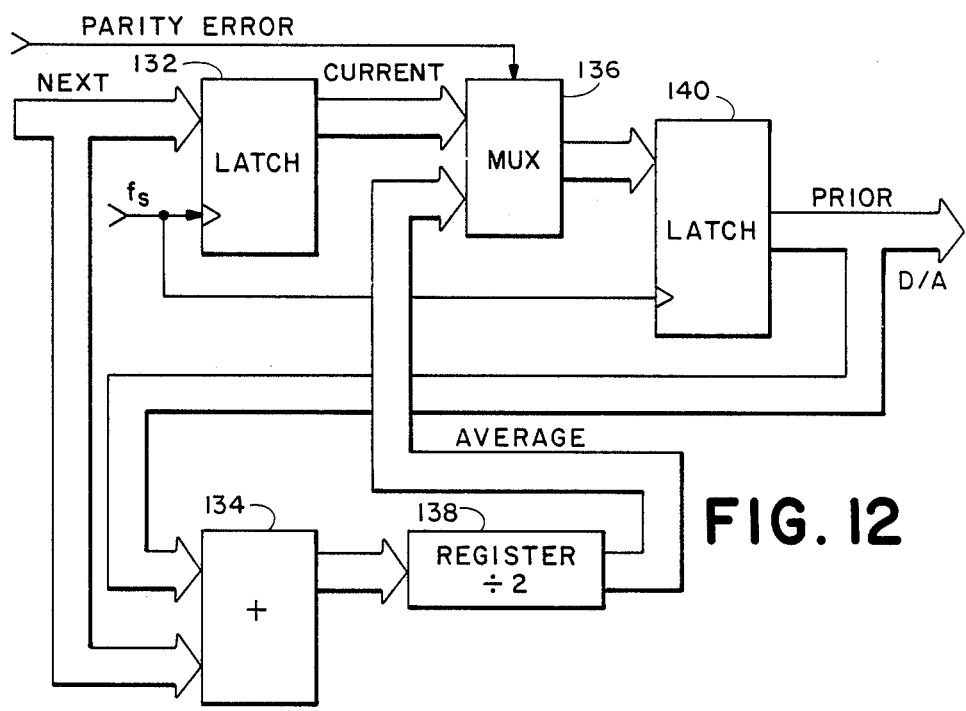
FIG. 12 is a block diagram of smoothing circuit for the system according to the present invention.

FIG. 12 shows a technique for replacing a current invalid sample as determined by a parity error with an interpolated valid sample which is the average of the prior valid sample and the next sample. The output of the FIFO buffer 130 is input to a first latch 132, which typically is of the D-type, and to an adder 134. The output of the latch 132 is the current sample while the input is the next sample. The current sample is input to a multiplexer 136. The other input of the multiplexer 136 is the output of a divide-by-two circuit 138, which is typically a shift register. The input to the divide-by-two circuit 138 is the output of the adder 134. The multiplexer 136 is controlled by a parity error signal from the control and clock generator circuit 34. The output of the multiplexer 136 is input to a second latch 140, similar to the first latch 132, the output of the second latch being the prior sample. Both latches are clocked by the sample frequency $f_s$. When there is no parity error the current sample is passed by the multiplexer 136 from the first latch 132 to the second latch 140. When a parity error is detected the parity error signal causes the multiplexer 136 to pass the averaged sample, which is the sum of the prior sample and the next sample divided by two, from the divide-by-two circuit 138 to the second latch 140. Thus the sample sequence becomes prior sample/averaged sample/next sample in lieu of prior sample/current sample/next sample.

Thus, the present invention provides a high precision digital audio transmission system which is compatible with the standards of the common communication carriers by converting the audio to digital via a high resolution A/D converter, providing a parity check, checking for all zeros to assure a minimum ones percentage and a maximum consecutive zeros limit for the data, and time domain multiplexing the two channels of data into a format compatible with standard common carrier frames. At receipt of the data the two channels of data are reconstructed by decoding the received common carrier frames, reconstructing the digital samples and checking for parity, and converting the digital samples into the two channels of analog data, repeating samples where a parity error is detected rather than outputting an erroneous sample.

What is claimed is:

1. A digital audio transmission system which is compatible with a common carrier system comprising:

means for converting a first channel and a second channel of analog information into a time domain multiplexed digital signal having consecutive digital samples of the analog information alternating between the two channels, each digital sample having two digital words, one word having the odd bits of the digital sample and the other having the even bits of the digital sample; wherein the even samples of said first channel and the odd samples of said second channel are transmitted in a first frame and the odd samples of said first channel and the even samples of said second channel are transmitted in the next frame immediately following said first frame; and means for encoding the time domain multiplexed digital signal into a plurality of master frames each having a plurality of subframes, each subframe corresponding to a frame compatible with the common carrier system.

2. A system as recited in claim 1 further comprising:
means for decoding the time domain multiplexed digital signal from the master frames; and
means for converting the time domain multiplexed digital signal into the two channels of analog information.

3. A system as recited in claim 1 further comprising:
means for adding a parity bit to each digital sample, the parity bits being combined to form parity samples which are input to the master frames together with the digital samples by the encoding means; and
means for checking each digital word for all zero bits and setting to one the least significant bit of the digital words which have all zero bits to assure no more than a maximum number of consecutive zero bits within any master frame as well as at least a minimum ones percentage.

4. A system as recited in claim 2 wherein the time domain multiplexed digital signal converting means comprises:
means for checking for parity errors for each digital sample; and
means for replacing the digital sample when a parity error is detected with a corrected digital sample.

5. A system as recited in claim 4 wherein the corrected digital sample comprises the prior digital sample.

6. A system as recited in claim 4 wherein the corrected digital sample comprises an interpolated digital sample based upon the prior digital sample and the next digital sample.

* * * * *